United States Patent
Neelakant

(10) Patent No.: US 9,904,936 B2
(45) Date of Patent: Feb. 27, 2018

(54) METHOD AND APPARATUS FOR IDENTIFYING ELEMENTS OF A WEBPAGE IN DIFFERENT VIEWPORTS OF SIZES

(71) Applicant: Adobe Systems Incorporated, San Jose, CA (US)

(72) Inventor: Vineeth Neelakant, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1012 days.

(21) Appl. No.: 14/083,720

(22) Filed: Nov. 19, 2013

(65) Prior Publication Data

US 2015/0142567 A1    May 21, 2015

(51) Int. Cl.
G06F 3/048 (2013.01)
G06Q 30/02 (2012.01)
G06F 17/30 (2006.01)
G06F 15/16 (2006.01)

(52) U.S. Cl.
CPC ... *G06Q 30/0256* (2013.01); *G06F 17/30864* (2013.01); *G06F 17/30902* (2013.01)

(58) Field of Classification Search
CPC ...... G06F 15/16; G06F 17/30; G06F 17/2247; G06F 17/30864; G06F 17/30902; G06Q 10/00; G06Q 30/0256
USPC .................................................. 715/781, 234
See application file for complete search history.

(56) References Cited

U.S. PATENT DOCUMENTS

| | | | | |
|---|---|---|---|---|
| 8,081,827 B2* | 12/2011 | Gormish | ............ | G06K 9/00442 345/1.1 |
| 8,555,155 B2* | 10/2013 | Harrison | ........... | G06F 17/30899 709/203 |
| 9,330,395 B2* | 5/2016 | Hauser | ............... | G06Q 30/0201 |
| 9,646,362 B2* | 5/2017 | Dai | ........................... | G06T 3/40 |
| 2011/0302524 A1* | 12/2011 | Forstall | ............ | G06F 17/30905 715/781 |
| 2012/0190386 A1* | 7/2012 | Anderson | .............. | G01C 15/04 455/456.3 |

OTHER PUBLICATIONS

G. Armano, A. Giuliani and E. Vargiu. *Experimenting Text Summarization Techniques for Contextual Advertising.* IIR 2011: Second Italian Workshop on Information Retrieval, CEUR Workshop Proceedings, vol. 704, Jan. 27-28, 2011, Milan (Italy).
Aris Anagnostopoulos, Andrei Z. Broder, Evgeniy Gabrilovich, Vanja Josifovski, and Lance Riedel. Nov. 6-7, 2007. Just-in-time contextual advertising. In *Proceedings of the sixteenth ACM conference on Conference on information and knowledge management* (CIKM '07). ACM, New York, NY, USA, 331-340.

\* cited by examiner

*Primary Examiner* — Cesar Paula
*Assistant Examiner* — Jian Huang
(74) *Attorney, Agent, or Firm* — Keller Jolley Preece

(57) ABSTRACT

A method for identifying elements of a webpage is provided. The method includes accessing, by an electronic device, a document object model (DOM) of the webpage. Changes applied to properties of a plurality of elements of the webpage across different media queries for different viewports are then analyzed using the DOM. The different viewports are of different sizes. Based on analyzing, ranking score is determined for each element. Elements having ranking score greater than a predefined threshold are identified as representative elements of the webpage.

20 Claims, 11 Drawing Sheets

US 9,904,936 B2

METHOD AND APPARATUS FOR IDENTIFYING ELEMENTS OF A WEBPAGE IN DIFFERENT VIEWPORTS OF SIZES

BACKGROUND

A webpage, typically, includes a plurality of elements. Examples of elements, typically, include main content items of the webpage, navigation bars, header, footer and side bars. Some elements of the webpage (e.g., the main content) are of higher importance for some purposes (e.g., advertising, keyword extraction, webpage indexing) than other elements, such as header, footer etc. In order to use the important elements for those purposes, the important elements first need to be identified. Existing methods make an attempt to identify the important elements of the webpage by analyzing content of the webpage itself to determine if it is an important element. However, these existing methods for identifying the important elements suffer from one or more drawbacks, such as inaccuracy and inefficiency. Therefore, there is a need for an improved technique for identifying important elements of the webpage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The method includes accessing, by an electronic device, a document object model (DOM) of the webpage. Changes applied to properties of a plurality of elements of the webpage across different media queries for different viewports are then analyzed using the DOM. The different viewports are of different sizes. Based on analyzing, ranking score is determined for each element. Elements having ranking score greater than a predefined threshold are identified as representative elements of the webpage.

Figure 1:
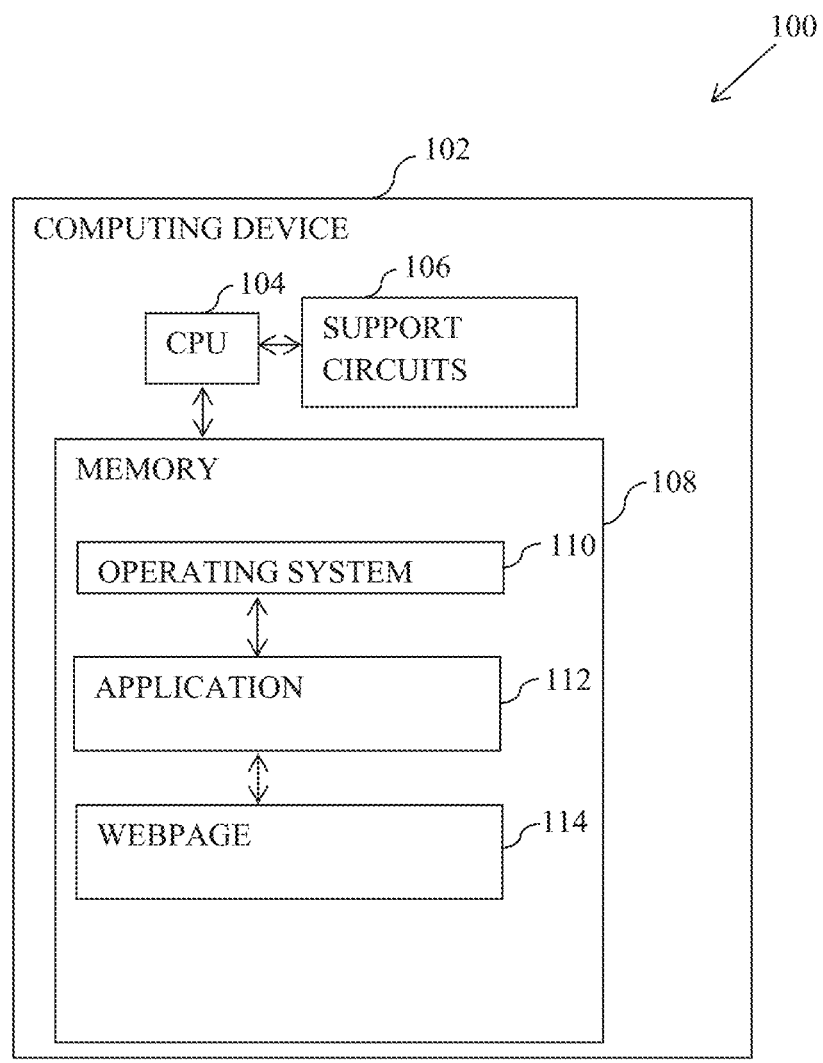
FIG. 1 is a system for identifying elements of a webpage, according to one or more embodiments.

While the method and system is described herein by way of example for several embodiments and illustrative drawings, those skilled in the art will recognize that the method and system for identifying elements of a webpage is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for identifying elements of a webpage. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

Often, it is required to identify important elements of the webpage (e.g., the main content) for some purposes (e.g., generating summary of the webpage, advertising, keyword extraction, webpage indexing) than other elements, such as header, side bar, footer etc. Few existing techniques for identifying elements of a Hyper Text Markup Language (HTML) webpage and using the identified elements for generating summary of the HTML webpage include extraction-based approach and abstraction-based approach. In extraction based approach, sentences, phrases and words are extracted from the HTML webpage and used in summarization. The sentences, phrases and words that have higher occurrence rate in the HTML webpage are identified and used for various purposes. The higher occurrence rate is determined from HTML tags, such as <h1>, <p>, <div>, accessible from code of the HTML webpage. However, the extraction based approach has a drawback that the unimportant HTML elements, such as unimportant sentences, phrases and words, are identified based on higher occurrence rate because same HTML tags, such as a <div> tag, contains the main content and related articles text from the side bar. For example, text from a side bar of related articles, which is of relatively lesser importance, in a news website, can have the same <div> tag as that of the main content and can lead to generation of inaccurate summary.

In abstraction based approach, the summary is phrased or paraphrased from the HTML webpage using techniques of Natural Language Processing (NLP). Abstraction based approaches are harder to develop due to processing complexities involved in NLP. Other approach such as using semantic tags is also not reliable since semantic tags are not widely used yet and are unsuitable for older pages. Further, the semantic tag approach cannot differentiate the important elements which are enclosed in same HTML tags, such as a <div> tag containing the main content and the <div> tag containing the related articles from the side bar.

Hence, existing techniques fail to provide a desired solution for identifying important elements of the webpage and there is a need for an improved technique for identifying important elements of the webpage.

In accordance to embodiments of the present invention and as will be described in more detail below, a method for identifying important elements of the webpage, by an electronic device, is provided. In one embodiment, identifying includes determining important elements of the webpage and processing the important elements for various purposes, such as webpage indexing and keyword extraction. The identifying also includes removing the elements other than the important elements from the webpage to make processing of the important elements of the webpage accurate and efficient. For identifying the important elements, the method includes accessing a document object model (DOM) of the webpage. From the DOM, various elements of the webpage can be accessed and analyzed. The DOM includes code listing. The code listing includes media queries. The media queries indicate how the webpage will be rendered on each electronic device, for example smartphone, desktop computer etc. Each media query includes a media type, for example type of the electronic device, and zero or more expressions to indicate how the webpage is to be rendered based on the electronic device. In particular, the expressions indicate how each element of the webpage is to be rendered based on the electronic device. The expressions include a property, for example size, display order etc., of the element and corresponding value for the property. The property indicates how the element is to be rendered. For example, one expression can indicate that display an element on the webpage at size 720 pixels (px) on desktop computer and display the same element at size 480 px on the smartphone. Since the elements and properties of the elements can be accessed via the media queries, the properties of the elements are analyzed across different media queries for different devices to determine important elements of the webpage.

In some embodiments, the properties are not just analyzed across different devices but across different viewports. A viewport refers to display area in which the webpage is displayed. The viewports differ across the electronic devices due to different screen sizes of the electronic devices. The viewports also differ within the same electronic devices due to different window sizes, for example when a user alters the size of the window in which webpage is displayed.

The analysis includes, initially, providing a ranking score to each element of the webpage. For example, a similar ranking score can be provided to each element initially or any other existing technology can be used to determine an initial ranking score for each element. Based on the changes in the properties of the elements across different media queries across different viewports, the ranking score for the elements are altered. The properties, and in particular the changes in the properties, are analyzed to rank the elements. The properties of the elements differ across different viewports or different viewport sizes due to different requirements for each viewport size. The different requirements exist due to different screen sizes of different devices. The analysis of the changes in the properties is performed because the changes when analyzed indicate which element is important and which is not. A developer while developing the webpage specifies the media queries to indicate how the webpage is to be rendered. The overall content of the webpage remains same across different viewports while layout of the overall content changes. For example, the main content of the webpage and side bar of the webpage may have same size and position of display in the desktop computer. While the main content can be displayed in increased size and on top in the smartphone, and the side bar can be displayed in decreased size and below the main content in the smartphone. The developer could have set the values of the properties of the main content and the side bar in such a manner because the main content of the webpage is more important as compared to the side bar. Hence, by analyzing the changes in the properties across different media queries across different viewports the important elements of the webpage can be identified in an accurate and efficient manner. The ranking score for each element is altered based on the analysis. Altering the ranking score includes either increasing the ranking score or decreasing the ranking score. For example, if a size of the element varies across different viewports then the ranking score of the element is altered to indicate that the element is not of similar importance across different viewports. If the size of the element is retained across the smartphone and the desktop computer then the retaining indicates that the element is important because despite reduction in screen size the size of the element remains same. The ranking score of the element is then increased. After altering, the ranking scores are final ranking scores for each element. Each element having its ranking score greater than a predefined threshold is then identified as a representative element of the webpage to various algorithms for further processing of the element. The threshold can be varied to obtain a desired number of identified elements. By varying the threshold and eliminating more number of elements for further processing, the accuracy and efficiency can be controlled. The lesser the number of identified elements, relatively lesser processing time is required for the elements in further processing. The higher the threshold, relatively more accurate results, i.e. only the most important elements, are identified. The elements having ranking scores greater than the predefined threshold can then be used for various purposes, i.e. further processing. For example, the elements can be used for generating a summary of the webpage, for advertising, for extracting keywords, or by web crawlers. The elements are used for various purposes according to various existing techniques. Examples of existing techniques for generating the summary of the webpage using the element includes, but are not limited to, algorithms for indexing webpages using the element, algorithms for advertising based on the element, algorithms for generating summary of the webpage using the element, algorithms for generating recommendations using the element etc.

Terms Definitions

An element of a webpage may include a subset or a portion of the webpage. Examples of the elements include, but are not limited to, navigation bar, side bar, main content, header, footer etc. The elements can be tagged. For example, elements can be tagged using HTML code and are then referred to as HTML elements.

A representative element of the webpage is defined as an element that has ranking score greater than a predefined threshold. The representative element can be a single element or can be a combination of one or more elements. In some embodiments, the element meeting threshold may not be necessary and the representative element may be defined as an element representative of the webpage which is used for further processing instead of the entire webpage.

An electronic device is a device using which the webpage can be processed. The electronic device, generally, includes a processor to process instructions stored in a memory of the electronic device to perform certain functions. Examples of the processing functions include, but are not limited to, rendering the webpage, identifying elements of the webpage, analyzing the webpage, parsing the webpage, ranking the elements of the webpage etc. Examples of the electronic device include, but are not limited to, computer, laptop computer, notebook computer, tablet computer, server, smartphones, mobile phones, combination of servers, and any other device that includes one or more processors to process the webpage.

Properties include various aspects related to the elements of the webpage. For example, size of the elements, display of the elements, position of the elements, visibility of the elements etc. In one embodiment, the properties include cascaded style sheet (CSS) properties. The CSS properties include padding, margin, float, size which in turn includes width and height, and display which in turn includes visibility.

A media query includes expressions that indicate how elements of the webpage need to be rendered in different conditions. The different conditions include different devices or different display areas in which the webpage is to be displayed. In one example, the media query enables webpage rendering to adapt to different conditions. For example, CSS media queries include a media type and zero or more expressions. The media type indicates type of the electronic device or type of the display area. The expressions indicate how the element needs to be rendered on different media types. The expressions, involving media features, resolve to either true or false. The result of the media query is true if the media type specified in the media query matches the type of electronic device the webpage is being displayed on and all expressions in the media query are true. When the media query is true, the corresponding CSS rules are applied. Examples of the different conditions include, but are not limited to, different viewport sizes of different electronic devices.

A viewport is a viewing region of the electronic device. The viewing region differs across different electronic devices due to different screen sizes. For example, the viewport for a desktop computer is different than that of a smartphone. In similar manner, the viewing region can differ due to various reasons including, but not limited to, different browser size on same electronic device, user activities etc.

A DOM is a cross-platform and language-independent convention or platform- and language-neutral interface for representing and interacting with elements in various documents. Examples of the documents include, but are not limited to, HyperText Markup Language (HTML) webpage, Extensible HTML (XHTML) webpage etc. The DOM enables access to media queries.

In the following discussion, a section entitled "Example System" is first described that is operable to employ techniques described herein. Following this, a section entitled "Example Procedures" describes some example methods for identifying elements of a webpage in accordance with one or more embodiments.

Example System

FIG. 1 is a block diagram of a system 100 for identifying elements of a webpage, according to one or more embodiments. The system 100 includes an electronic device 102. The electronic device 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 may include at least one of Read Only Memory (ROM), Random Access Memory (RAM), disk drive storage, optical storage, removable storage or the like. The memory 108 includes an operating system 110, and an application 112. The operating system 110 may include various commercially known operating systems.

Examples of the application 112 include, but are not limited to, browser extension, standalone application with access to a document object model (DOM) of a webpage 114, a headless browser, plugin, browser with a component for identifying the elements of the webpage 114, web crawler with a component for identifying the elements of the webpage 114 and any other software application for identifying elements of the webpage 114.

The system 100 may further include one or more networks (not shown in FIG. 1) via which electronic device 102 may communicate. The network(s) may assume a variety of different configurations, such as a local area network (LAN), a wide area network (WAN), the Internet, and so on. In at least some embodiments, functionalities discussed with reference to the system 100 and/or other portions of the discussion herein may be implemented in a distributed environment, for example cloud.

The system 100 further includes one or more input devices (not shown in FIG. 1) connected to the electronic device 102. Examples of the one or more input devices include, but are not limited to, peripheral devices, keyboard, mouse etc. In some embodiments, the electronic device 102 may not be connected to the input devices separately and may have functionalities of these input devices built into the electronic device 102. For example, in cases in which the electronic device 102 is touch enabled device, gesture enabled device, or paired to such similar devices that act as the input devices.

In various embodiments, the application 112 accesses the DOM of the webpage 114. The webpage 114 includes various elements. The properties of the elements of the webpage 114 are then analyzed across different viewport sizes. The DOM of the webpage 114 includes media queries that indicate how the elements of the webpage 114 get rendered or act across different viewport sizes. Changes in properties of the elements of the webpage 114 across different media queries across different viewport sizes are then determined from the DOM and analyzed. An initial ranking score is provided to each element of the webpage 114. The ranking score is changed based on the analysis of the media queries and a final ranking score is determined for each element. The final ranking score for each element is compared against a predefined threshold. If the final ranking score of an element exceeds the predefined threshold then the element is identified as important element of the webpage 114 and is identified. The element can then be used for various purposes including generating a summary of the webpage 114, for advertising, for extracting keywords, or by web crawlers.

In various embodiments, the application 112 can be embodied in different forms and the forms are now described using various examples. For example, the application 112 can be embodied at a client end or at a server end, or at a combination of client and server end. As such, the functionality of the application 112 can be performed entirely at the client end or at the server end, or partially at the client end and partially at the server end. Examples of the server end or server includes, but are not limited to, webserver hosting the webpage 114, an analytics server, combination of the analytics server and the webserver, combination of the analytics server and an advertisement server, combination of the webserver and the advertisement server, any other server, and the like.

In one embodiment, the electronic device 102 is a client side device and the application 112 is embodied in form of a browser. A user of the electronic device 102 requests the webpage 114 and the webpage 114 is rendered on the electronic device 102. The request is made via the browser. The application 112 within the browser then accesses the DOM of the webpage 114 and analyzes the webpage 114 to identify elements of the webpage 114 meeting the predefined threshold.

In another embodiment, the electronic device 102 is the client side device and the application 112 is embodied in form of a plugin or a browser extension. The user of the electronic device 102 requests the webpage 114 and the webpage 114 is rendered on the electronic device 102. The request is made via the browser. The application 112 embodied as the plugin or the browser extension then accesses the DOM of the webpage 114 and analyzes the webpage 114 to identify elements of the webpage 114 meeting the predefined threshold.

In yet another embodiment, the electronic device 102 is the client side device and the application 112 is embodied in form of an application installed on the electronic device. The user of the electronic device 102 requests the webpage 114 and the webpage 114 is rendered on the electronic device 102. The request is made via the browser. The application 112 connects to the browser via browser application programming interfaces (APIs) for accessing the DOM of the webpage 114 and for analyzing the webpage 114 to identify elements of the webpage 114 meeting the predefined threshold.

In still another embodiment, the electronic device 102 is the client side device and the application 112 is embodied in form of a standalone application installed on the electronic device 102. The application 112 has an in-built browser. A user of the electronic device 102 requests the webpage 114 and the webpage 114 is rendered on the electronic device 102. The request is made via the browser of the application 112. The application 112 then accesses the DOM of the webpage 114 and analyzes the webpage 114 to identify elements of the webpage 114 meeting the predefined threshold.

In still another embodiment, the electronic device 102 is the client side device and the logic of analyzing the webpage 114 is embodied in the webpage 114 itself in the form of a script. A user of the electronic device 102 requests the webpage 114 and the webpage 114 is rendered on the electronic device 102. The request is made via the browser. The browser renders the webpage 114 and parses the webpage 114 to reach the script. The script of the webpage 114 is then executed resulting in accessing of the DOM of the webpage 114 and analyzing of the webpage 114 to identify elements of the webpage 114 meeting the predefined threshold.

In still another embodiment, the electronic device 102 is a server and the application 112 is embodied in form of a web crawler. The web crawler accesses the webpage 114 and analyzes the webpage 114 to identify elements of the webpage 114 meeting the predefined threshold.

In still another embodiment, the electronic device 102 is the server and the application 112 is embodied in form of a headless browser. The headless browser accesses the webpage 114 and analyzes the webpage 114 to identify elements of the webpage 114 meeting the predefined threshold.

In still another embodiment, the electronic device 102 is the server and the application 112 is embodied in form of an application or software program or code on the electronic device. The application 112 residing on the server, i.e. the electronic device 102, accesses the webpage 114 and analyzes the webpage 114 to identify elements of the webpage 114 meeting the predefined threshold.

In still another embodiment, the logic of the application 112 is embodied as a cloud service. The user provides the webpage 114 or path of the webpage 114 to the cloud service, and the cloud service then analyzes the webpage 114 to identify elements of the webpage 114. The identified elements can then be displayed in a new window on the client side device or can be used for lean printing.

In still another embodiment, the logic of the application 112 is embodied partially at the client side device and partially at the server. In response to rendering of the webpage 114 at the client side device, a request is sent to the server to enable identification of the elements of the webpage 114 by the server. In one example, the request includes the webpage 114 or one or more elements of the webpage 114. The request can be sent as a result of the script included in the webpage 114 or by any other embodied form of the application 112 at the client side device. In another example, the request includes an indication for the server to fetch the webpage 114 or one or more elements of the webpage 114 from a webserver hosting the webpage 114. In yet another example, the request includes an indication for the server, for example analytics server, to fetch identified elements of the webpage 114 from the webserver. In such a scenario, the logic of the application 112 is embodied in form of the webserver.

In some embodiments, when the electronic device 102 is the server and the application 112 runs on the server, the application 112 can be written in C++, or in node.js to access the DOM via jsdom module. The application 112 can also be implemented using libraries like Chromium Embedded Framework (CEF) or Phantomjs. In another embodiment, when the electronic device 102 is the client side device and the application 112 runs at the client side, the application 112 can be implemented using Javascript or native support. The webpage 114 can also include the script in various forms including, but not limited to Javascript etc. In yet another embodiment, when the electronic device 102 is partially embodied at the client end and partially at the server end or the logic of the application 112 is partially embodied at the client end and partially at the server end, the application 112 can be implemented using various scripts or languages or frameworks.

In various embodiments, the use of the identified important elements for various purposes can be performed at the client side device or at the server, or using combination of the client side devices or servers or both. For example, the identified elements can be sent to an advertisement server by the webserver or the client side device to fetch advertisements. The identified elements can be used by an Interest Area Crawler to extract terms that occur in high frequency in the identified elements and to further process the extracted terms to identify interest areas. The identified elements can be used by a keyword extraction and indexing module to aid site search. The identified elements can be sent by the client side device to an analytics server to perform analytics. The identified elements can be sent by a print server or a cloud print service to the client side device for display or for lean printing.

Example Procedures

Figure 2A:
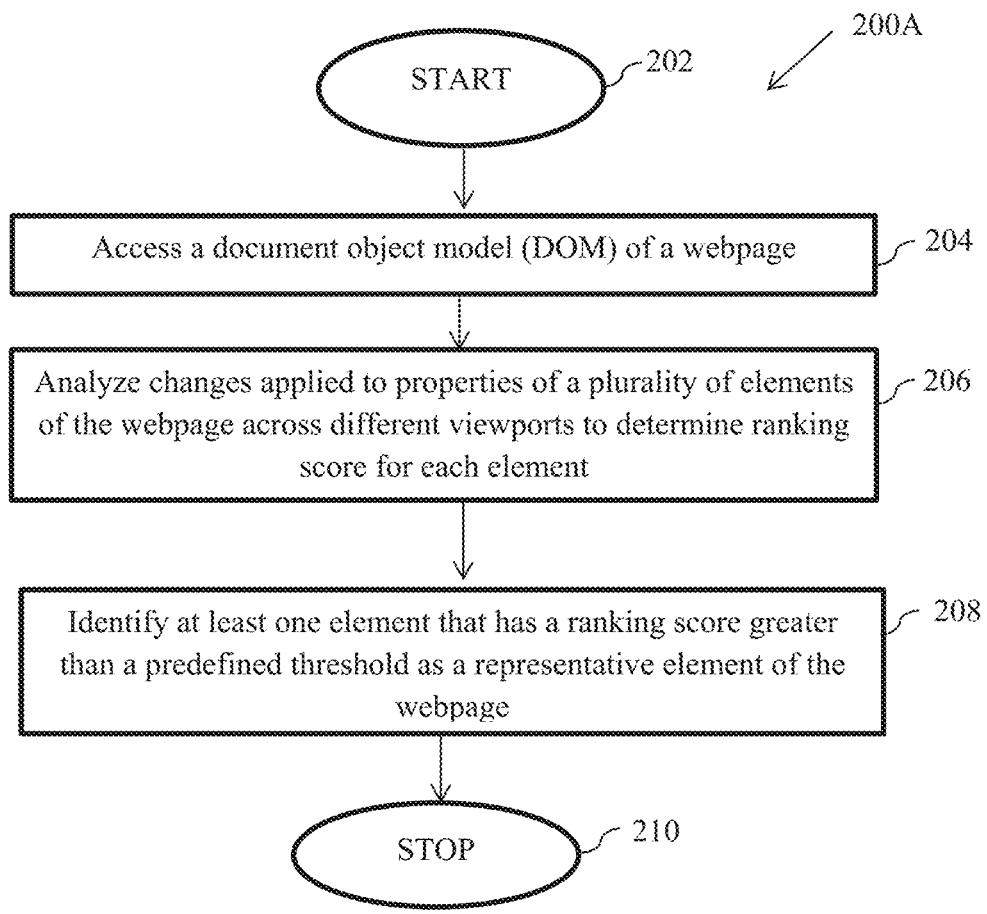
FIG. 2A is a flowchart of a procedure for identifying elements of the webpage, according to one or more embodiments.

FIG. 2A is a flowchart of a procedure 200A for identifying elements of a webpage, for example the webpage 114, by an application, for example the application 112 of FIG. 1, according to one embodiment.

The procedure starts at step 202 and proceeds to step 204.

At step 204, a DOM of the webpage is accessed. In one embodiment, a user of a client device opens the webpage in a browser. Either a script present in the webpage or the application residing on the client device or a combination of both causes accessing of the DOM of the webpage. The webpage includes a plurality of elements.

At step 206, properties of the elements of the webpage are analyzed across different viewports. The viewports have different sizes. In one example, the properties are analyzed by analyzing changes in the properties of the elements across different media queries for different viewports. The analysis is done for each element, for example a first element. The analysis of the changes in properties includes analysis of structural changes to the elements of the webpage. Examples of the properties include, but are not limited to, visibility of the elements across different viewports, size of the elements across different viewports, positioning of the elements across different viewports, and relative positioning of the elements across different view ports.

In some embodiments, analyzing includes providing an initial ranking score to each element of the webpage. In one example, the initial ranking may be same for all elements, while in other example, the ranking score can be decided based on some statistics or heuristics. For example, if a ranking engine or algorithm or webpage author provides some ranking for elements of the webpage then the initial ranking score can be based on that or the initial ranking score can be adjusted based on semantic tags. For example "article" and "section" will have higher initial ranking score, while "aside" and "footer" will have lower initial ranking score. The ranking engine or algorithm can be any existing technology.

The initial ranking scores are altered based on the analysis of the changes in the properties across different viewports. The changes in the properties can be determined by analyzing the media queries. Various examples are now provided to indicate analysis of the changes in the properties of the elements across different media queries for different viewports.

In one embodiment, the analysis includes determining visibility or changes in visibility of the elements by determining the elements hidden in lower sized viewports. For determining changes in the visibility of the elements, CSS property such as "display" is analyzed. A map data structure "DisplayMap" is initialized to associate a CSS selector with changes in the CSS property values across different media queries. The map associates the CSS selector with an array. The array includes a pair of viewport size obtained from media query and the CSS property value. TABLE 1 below indicates one such map in which (920 px, block) indicates the pair of viewport size, i.e., 920 px, and the CSS property value, i.e. block. "div.menu" is the CSS selector. "px" stands for pixels. (920 px, block), (720 px, none), (480 px, none) is one example of the array. For media queries that use generic terms instead of exact dimensions a predefined width value is used. For example, if the media query mentions "handheld" then a width value of 640 px is used. If the CSS property value is not explicitly mentioned, then a default value is taken. For example, for "display" CSS property, the default value is "block" for block level elements like div.

TABLE 1

| | |
|---|---|
| div.menu | (920px, block), (720px, none), (480px, none) |
| .nav | (920px, block), (720px, none), (480px, none) |
| .info | (920px, block), (720px, block), (480px, inline) |

TABLE 1 is generated by traversing CSS rules associated with the webpage using the DOM. For each CSS rule, a minimum size on which the CSS rule operates is noted from the media query. A CSS rule consists of a CSS selector and a set of CSS property values that are applied to the elements that match the CSS selector. Referring to Code Listing 1 below, "div.menu, .nav" is the CSS selector and "display: none" is the CSS property value. The minimum size is extracted from "min-width" of the "@media" declaration. In illustrated embodiment, TABLE 1 is generated from following Code Listing 1. Code listing 1 is a portion of code of the webpage indicating the media queries.

Code Listing 1

```
@media screen and (min-width: 480px) and (max-width:719px) {
    div.menu, .nav {
        display:none;
    }
    .info {
        display: inline;
    }
}
@media screen and (min-width: 720px) and (max-width: 919px) {
    div.menu, .nav {
        display:none;
    }
    .info {
        display: block;
    }
}
@media screen and (min-width: 920px) {
    div.menu, .nav {
        display:block
    }
    .info {
        display: block;
    }
}
```

The minimum size is obtained from the media query in which the rule occurs. For each CSS property in the CSS rule, if the CSS property is "display" then the pair (minimum size, CSS property value) is added in the array associated with the CSS selector in the map. The CSS selector corresponds to multiple elements of the webpage, i.e., one or more elements of the webpage can match the CSS selector. For each CSS selector in the map, if the CSS selector has CSS property value of "none" then reduce the ranking scores for all elements of the webpage matching to that CSS selector. For example, the ranking scores for the elements corresponding to the CSS selectors "div.menu" and ".nav" are reduced while for the elements corresponding to the CSS selector ".info" the ranking score is not reduced. The CSS property value of "none" indicates that the corresponding elements of the webpage are hidden or are invisible in lower viewport sizes. The reduction value of the ranking scores can be preconfigured.

In illustrated embodiment and referring to first row in Table 1, 920 px is referred to as the first viewport and 720 px is referred to as the second viewport. An instance of an element corresponding to the CSS selector "div.menu" in 920 px viewport is referred to as the first element and in 720 px is referred to as the second element.

Figure 3A:
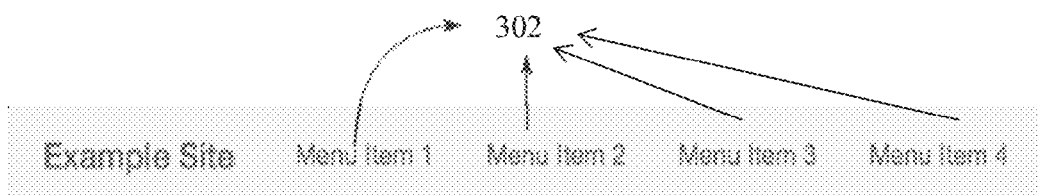
FIGS. 3A-3H are diagrams illustrating identifying elements of various webpages, according to one or more embodiments.
Figure 3B:

The embodiment is now illustrated using FIG. 3A and FIG. 3B. FIG. 3A and FIG. 3B indicate a webpage with elements 302 visible in FIG. 3A while invisible in FIG. 3B. In FIG. 3A, the elements 302 are visible on a viewport of a desktop computer while, in FIG. 3B, the elements 302 are hidden in a viewport of a mobile device and can be accessed by expanding menu 304. The invisibility of the elements 302 in the viewport of the mobile device is determined using media queries as explained in example above. The ranking scores of the elements 302 are then reduced.

In another embodiment, the analysis includes determining variation in size of the elements or determining the elements that are made prominent across the viewports. For determining changes in the size of the elements, CSS properties such as "width" or "height" are analyzed. A map data structure "SizeMap" is initialized to associate a CSS selector with changes in the CSS property values across different media queries. The map associates the CSS selector with an array. The array includes a pair of viewport size obtained from media query and the CSS property value. TABLE 2 below indicates one such map in which (920 px, 48%) indicates the pair of viewport size, i.e., 920 px, and the CSS property value, i.e., 48%. "article" is the CSS selector. (920 px, 48%), (720 px, 64%), (480 px, 80%) is the array. For media queries that use generic terms instead of exact dimensions a predefined width value is used. For example, if the media query mentions "handheld" then width value of 640 px is used.

TABLE 2

| Article | (920px, 48%), (720px, 64%), (480px, 80%) |
|---|---|
| Img.product | (920px, 25%), (480px, 20%) |
| Img.mail-icon | (920px, 50%), (480px, 50%) |

TABLE 2 is generated by traversing CSS rules associated with the webpage using the DOM. For each CSS rule, a minimum size on which the CSS rule operates is noted from the media query. The minimum size is obtained from the media query in which the rule occurs. For each CSS property in the CSS rule, if the CSS property is "width" or "height" or any other property indicative of size then the pair (minimum size, CSS property value) is added in the array associated with the CSS selector in the map. The CSS selector corresponds to multiple elements of the webpage, i.e. one or more elements of the webpage can match the CSS selector. For each CSS selector in the map, if size of the CSS selector decreases in viewport of lower size then reduce the ranking scores for all elements of the webpage matching to that CSS selector. For each CSS selector in the map, if size of the CSS selector increases in viewport of lower size then increase the ranking scores for all elements of the webpage matching to that CSS selector. For each CSS selector in the map, if size of the CSS selector remains same in viewport of lower size then retain the ranking scores for all elements of the webpage matching to that CSS selector. For example, the ranking scores for the elements corresponding to the CSS selector "article" is increased, for the elements corresponding to the CSS selector "img.product" is decreased, and for the elements corresponding to the CSS selector "img.mail-icon" is retained. The reduction or increase in value of the ranking scores can be preconfigured.

In illustrated embodiment and referring to second row in Table 2, 920 px is referred to as the first viewport and 480 px is referred to as the second viewport. An instance of an element corresponding to the CSS selector "img.product" in 920 px viewport is referred to as the first element and in 480 px is referred to as the second element.

Figure 3C:
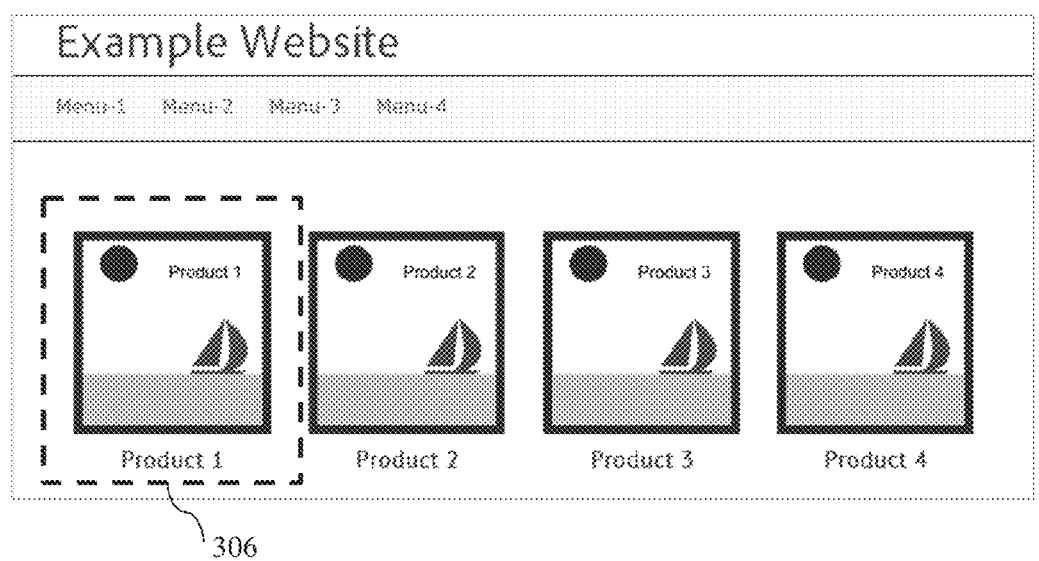
Figure 3D:
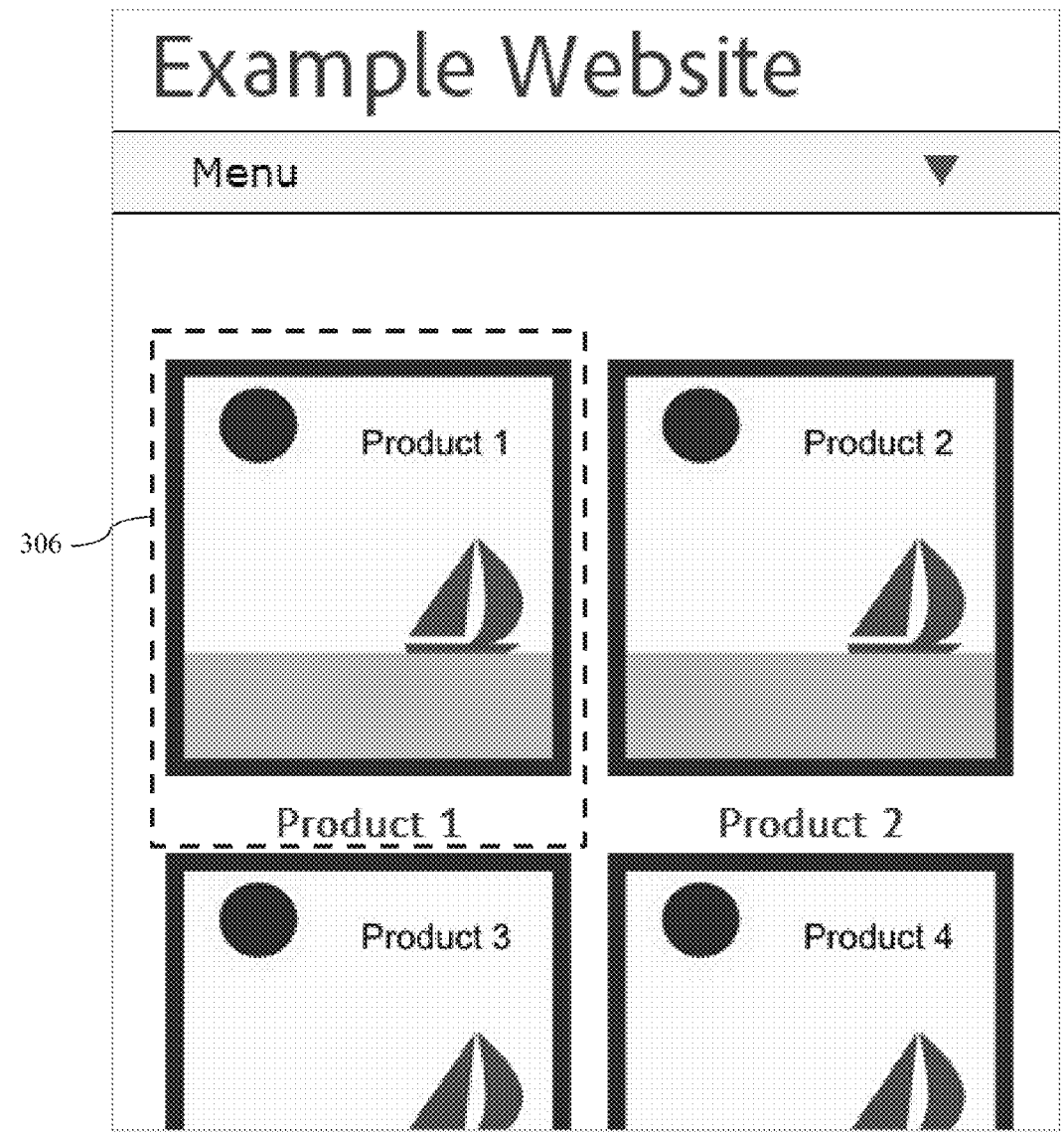

The embodiment is now illustrated using FIG. 3C and FIG. 3D. FIG. 3C and FIG. 3D indicate a webpage with element 306. In FIG. 3C, the element 306 is displayed on a viewport of a desktop computer while, in FIG. 3D, the element 306 is displayed in a viewport of a mobile device. Size of the element 306 is larger in the viewport of the mobile device than that in the viewport of the desktop computer. The difference in the size of the element 306 is determined using media queries as explained in example above. The ranking score of the element 306 is then increased.

In yet another embodiment the analysis includes, determining variation in position of the elements or relative position changes across the viewports. For determining changes in the size of the elements, CSS properties such as "float" are analyzed. A map data structure "PositionMap" is initialized to associate a CSS selector with changes in the CSS property values across different media queries. The map associates the CSS selector with an array. The array includes a pair of viewport size obtained from media query and the CSS property value. TABLE 3 below indicates one such map in which (920 px, right) indicates the pair of viewport size, i.e., 920 px, and the CSS property value, i.e., right. "div.related-article" is the CSS selector. (920 px, right), (720 px, right), (480 px, none) is one example of the array. The map is generated in a manner similar to that of TABLE 1 and TABLE 2.

TABLE 3

| div.related-article | (920px, right), (720px, right), (480px, none) |
|---|---|
| div.see-also | (920px, right), (720px, right), (480px, none) |

In illustrated embodiment, TABLE 3 is generated from Code Listing 2.

Code Listing 2

```
@media screen and (min-width: 480px) and (max-width:719px) {
    div.related-article { float:none; }
    div.see-also {float: none; }
}
@media screen and (min-width: 720px) and (max-width: 919px) {
    div.related-article{ float:right; width: 50%; }
    div.see-also{ float:right; width: 15%; }
}
@media screen and ( min-width: 920px) {
    div.related-article{ float:right; width: 50%; }
    div.see-also{ float:right; width: 15%; }
}
```

In one scenario, using the map, the elements are sorted based on the order of occurrence of the elements in the DOM tree, accessed from top to bottom. The elements with lower order, i.e., the elements occurring at beginning of the DOM are given higher priority than elements that occur at higher order, i.e. the elements occurring towards the end of the DOM hierarchy. Higher priority indicates higher ranking score or increase in ranking score. For example, consider the following HTML code, i.e., Code Listing 3. Referring to the Code Listing 3, the elements for which CSS rule "div.related-article" applies are given higher priority than elements to which CSS rule "div.see-also" applies, since "div.related-article" occurs before "div.see-also".

Code Listing 3

```
<body>
    <div class="article"> Lorem Ipsum...</div>
    <div class=" related-article "> Link 1, ...</div>
    <div class="see-also"> Link 2...</div>
<div class="article"> is given higher priority than <div class=" related-article ">, which is
given higher priority than <div class="see-also">
```

In some scenarios, using the map, the relative positioning of the elements across different viewports are also analyzed. For example, the element having higher position in the first viewport is given a higher ranking score or its ranking score is increased as compared to an element having relatively lower position in the second viewport. The second viewport has size smaller than that of the first viewport.

In some scenarios, using the map, the ranking scores of the elements are further adjusted relative to width of elements across different viewports. For example, if the element occupies 15% of width in the first viewport and has "float" changed from right to none in the second viewport, then its priority, i.e., ranking score, is lower than another element which occupies 50% width in the first viewport and has similar "float" changes for the second viewport. The second viewport has size smaller than that of the first viewport. Referring to the Code Listing 3, elements for which CSS rule "div.related-article" applies are given higher priority than elements to which CSS rule "div.see-also" applies. Low priority indicates no change or reduction in ranking score while high priority indicates increase in ranking score.

Figure 3E:
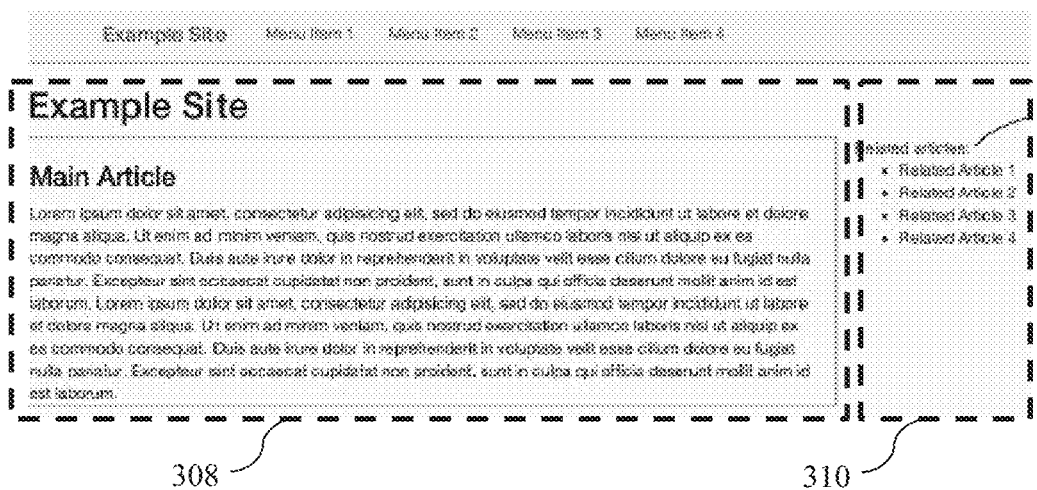
Figure 3F:
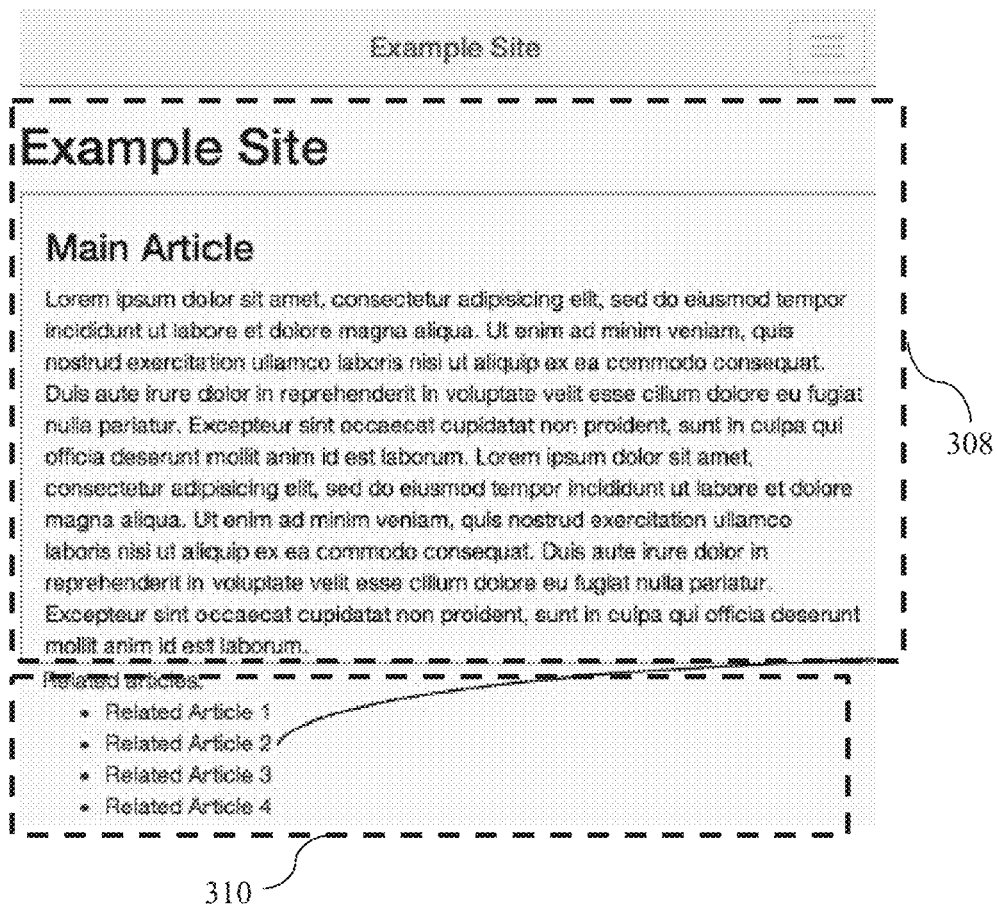

The embodiment is now illustrated using FIG. 3E and FIG. 3F. FIG. 3E and FIG. 3F indicate a webpage with one or more elements, for example an element 308 and an element 310. In FIG. 3E, the element are displayed on a viewport of a desktop computer while, in FIG. 3F, the element are displayed in a viewport of a mobile device. The position of the element 310 is different in the viewport of the mobile device than that in the viewport of the desktop computer while it is same for the element 308 in both the viewports. The ranking score of the element 310 is then decreased as the position of the element 310 is lowered or displayed at lower priority.

The ranking scores obtained after all alterations are final ranking scores for respective elements. The ranking scores are then compared against a predefined threshold and all elements having respective ranking scores greater than the predefined threshold are identified. The comparison can be a part of either step 206 or step 208.

The elements having ranking scores greater than the predefined threshold are then identified, at step 212, as the representative element of the webpage. The identified elements are representative of entire webpage and are then processed further. The elements having ranking scores greater than the predefined threshold are identified as important elements of the webpage.

Figure 2B:
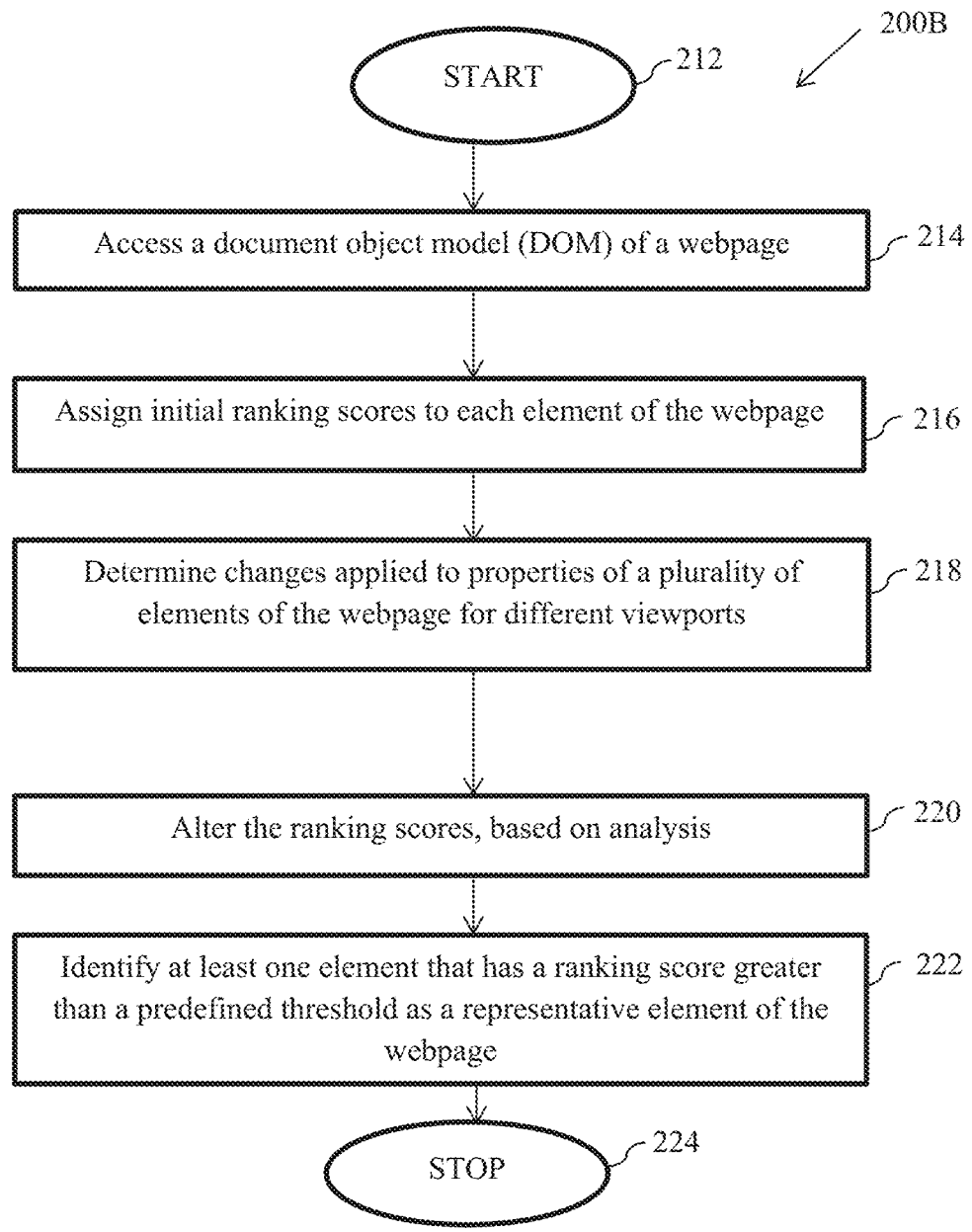
FIG. 2B is a flowchart of a procedure for identifying elements of the webpage, according to one or more embodiments.
Figure 3G:
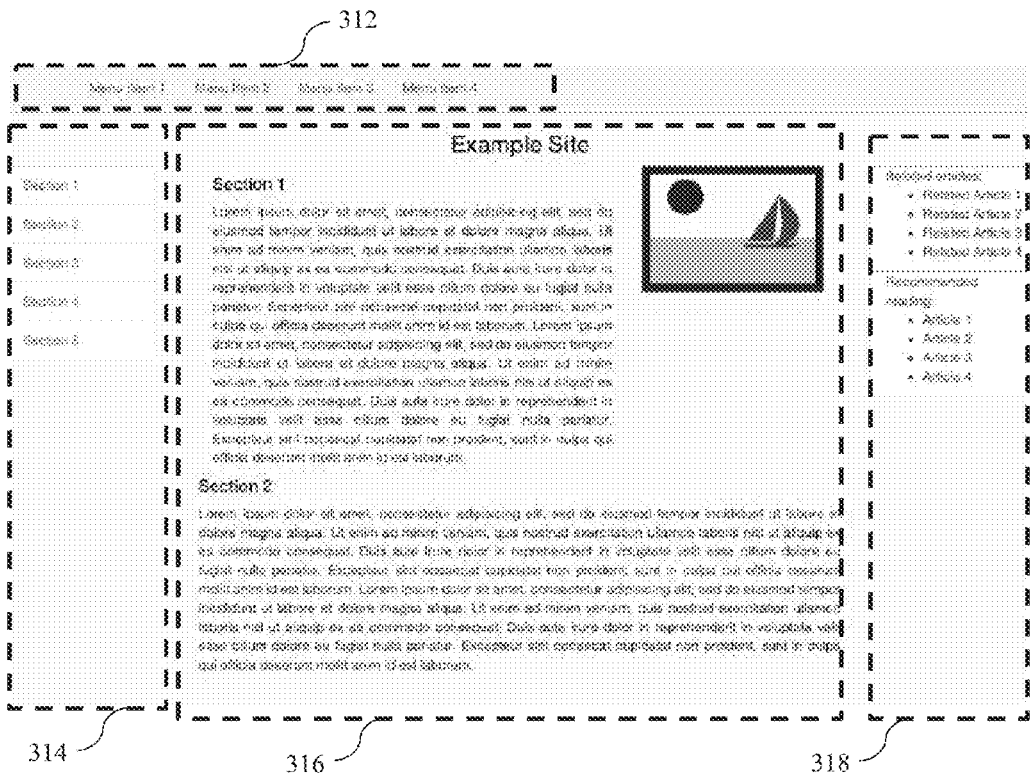
Figure 3H:
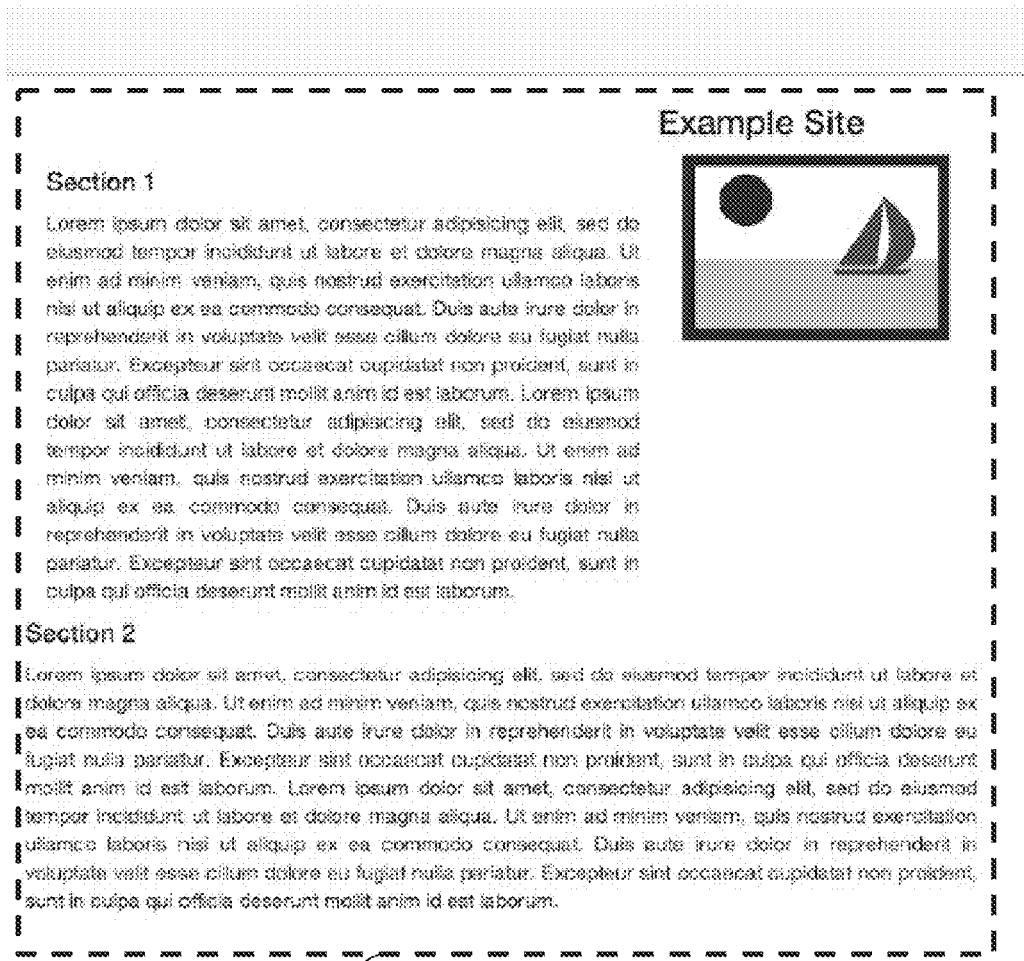

FIG. 3G and FIG. 3H illustrate identifying important elements of a webpage. In FIG. 3G, the webpage including one or more elements is displayed on a viewport of a desktop computer. The one or more elements include an element 312, an element 314, an element 316 and an element 318. FIG. 3H illustrates the webpage including the important elements of the webpage. The webpage including the element 316 is then identified. In illustrated example, the element 316 is identified as the important element of the webpage. The element 316 is identified as the important element of the webpage by using the procedure described in FIG. 2.

In some embodiments, the predefined threshold can be varied to vary number of elements to be identified.

In various embodiments, the identified elements are then further processed and utilized for various purposes. Examples of various purposes include, but are not limited to, advertising, summarizing the webpage, providing recommendations, crawling and indexing, searching, keyword extracting, lean printing, and context generating etc.

The procedure ends at step 210.

FIG. 2B is a flowchart of a procedure 200B for identifying elements of a webpage, for example the webpage 114, by an application, for example the application 112 of FIG. 1, according to one embodiment.

The procedure starts at step 212 and proceeds to step 214.

At step 214, a DOM of the webpage is accessed.

At step 216, an initial ranking score is assigned or provided to each element of the webpage.

At step 218, properties of the elements of the webpage are analyzed for different viewports. The viewports have different sizes. The analysis includes determining changes applied to the properties of the element of the webpage across different media queries for different viewports.

At step 220, the initial ranking scores are altered based on the analysis of the changes in the properties across different viewports. The changes in the properties can be determined by analyzing the media queries.

The ranking scores obtained after all alterations are final ranking scores for respective elements. The ranking scores are then compared against a predefined threshold and all elements having respective ranking scores greater than the predefined threshold are identified. The comparison can be a part of either step 220 or step 222.

The elements having ranking scores greater than the predefined threshold are then identified, at step 222, as the representative element or elements of the webpage. The elements having ranking scores greater than the predefined threshold are identified as important elements of the webpage.

In various embodiments, the identified elements are then utilized for various purposes. Examples of various purposes include, but are not limited to, advertising, summarizing the webpage, providing recommendations, crawling and indexing, searching, keyword extracting, lean printing, and context generating etc.

The procedure ends at step 224.

The embodiments of the present invention may be embodied as methods, system, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, system, or device. These computer program instructions may also be stored in a computer-usable or computer-readable memory that may direct a computer or other programmable data processing system to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor system, system, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, methods or systems that would be known by one of ordinary skill have not been described in detail so as not to obscure claimed subject matter.

Some portions of the detailed description are presented in terms of algorithms or symbolic representations of operations on binary digital signals stored within a memory of a specific system or specific electronic device or special purpose computing device or platform. In the context of this particular specification, the term specific system or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific system, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method comprising:
    accessing, by an electronic device, a document object model (DOM) of a webpage;
    determining, from the DOM, a first set of values of properties of a plurality of elements of the webpage for displaying the webpage using a first viewport of a first size;
    determining, from the DOM, a second set of values of the properties of the plurality of element of the webpage for displaying the webpage using a second viewport of a second size, wherein the first size differs from the second size;
    comparing the first set of values to the second set of values;
    determining a ranking score for elements of the plurality of elements based on whether values for properties of each element change between the first set of values and the second set of values; and
    identifying at least one element that has a ranking score greater than a predefined threshold as a representative element of the webpage.

2. The method as claimed in claim 1 further comprising at least one of:
    extracting keywords from the at least one element as keywords representative of the webpage;
    advertising on the webpage based on the at least one element;
    generating a summary of the webpage; or
    providing a recommendation based on the at least one element.

3. The method as claimed in claim 1, wherein the properties of a first element of the plurality of elements comprise at least one of:
   a visibility of the first element across different viewports comprising the first viewport and the second viewport;
   a size of the first element across the different viewports; or
   a position of the first element across the different viewports.

4. The method as claimed in claim 1, wherein analyzing comprises further comprising assigning one or more ranking scores to the plurality of elements.

5. The method as claimed in claim 1, further comprising altering the one or more ranking scores of the plurality of elements based on analyzing.

6. The method as claimed in claim 5, wherein altering the one or more ranking scores comprises at least one of:
   decreasing a ranking score of a first element if the first element is visible in the first viewport and m not visible in the second viewport, wherein the second size of the second viewport is smaller than the first size of the first viewport;
   increasing the ranking score of the first element if size of the first element is larger in the second viewport than that in the first viewport, wherein the second size of the second viewport is smaller than the first size of the first viewport; or
   increasing the ranking score of the first element if a position of the first element in a sorted document object model of the first viewport is higher than that in a sorted document object model of the second viewport, wherein the second size of the second viewport is smaller than the first size of the first viewport.

7. The method as claimed in claim 1, wherein the electronic device is at least one of a client device or a server, and the properties comprise Cascading Style Sheets (CSS) properties.

8. A method comprising:
   accessing, by an electronic device, a document object model (DOM) of a webpage;
   assigning one or more ranking scores to a plurality of elements of the webpage;
   determining, from the DOM, a first set of values of properties of the plurality of elements of the webpage for displaying the webpage using a first viewport of a first size;
   determining, from the DOM, a second set of values of the properties of the plurality of element of the webpage for displaying the webpage using a second viewport of a second size,
   wherein the first size differs from the second size;
   comparing the first set of values to the second set of values;
   altering the one or more ranking scores of the plurality of elements based on the comparing of the first set of values to the second set of values; and
   identifying at least one element, having a ranking score greater than a predefined threshold, as a representative of the webpage.

9. The method as claimed in claim 8, wherein the properties comprise Cascading Style Sheets (CSS) properties.

10. The method as claimed in claim 8, wherein the properties of a first element of the plurality of elements comprise at least one of:
    a visibility of the first element across different viewports comprising the first viewport and the second viewport;
    a size of the first element across the different viewports; or
    a position of the first element across the different viewports.

11. The method as claimed in claim 10, wherein comparing the first set of values to the second set of values comprises at least one of:
    determining the first element to be visible in the first viewport and not visible in the second viewport;
    determining the size of the first element to be different in the first viewport than in the second viewport; or
    determining the position of the first element to be different in the first viewport than in the second viewport.

12. The method as claimed in claim 10, wherein altering the one or more ranking scores of the plurality of elements comprises at least one of:
    decreasing a ranking score of the first element if the first element is visible in the first viewport and not visible in the second viewport, wherein the second size of the second viewport is smaller than the first size of the first viewport;
    increasing the ranking score of the first element if the size of the first element is larger in the second viewport than that in the first viewport, wherein the second size of the second viewport is smaller than the first size of the first viewport; or
    increasing the ranking score of the first element if the position of the first element in a sorted document object model of the first viewport is higher than that in a sorted document object model of the second viewport, wherein the second size of the second viewport is smaller than the first size of the first viewport.

13. The method as claimed in claim 10, wherein altering the one or more ranking scores of the plurality of elements comprises:
    providing a higher ranking score to the first element if the size of the first element in the first viewport is larger than size of a second element in the first viewport and similar changes are applied to Cascading Style Sheets (CSS) float property of the first element and of the second element in a second viewport as against the first viewport.

14. The method as claimed in claim 10, wherein altering the one or more ranking scores of the plurality of elements comprises:
    providing a higher ranking score to the first element if a position of the first element in a sorted document object model of the first viewport is lower than a position of the second element in the sorted document object model of the first viewport.

15. A non-transitory computer readable medium for storing computer instructions that when executed by at least one processor causes the at least one processor a computing device to:
    access a document object model (DOM) of a webpage;
    determine, from the DOM, a first set of values of properties of a plurality of elements of the webpage for displaying the webpage using a first viewport of a first size;
    determine, from the DOM, a second set of values of the properties of the plurality of element of the webpage for displaying the webpage using a second viewport of a second size, wherein the first size differs from the second size;
    compare the first set of values to the second set of values;
    determine a ranking score for elements of the plurality of elements based on whether values for properties of each element change between the first set of values and the second set of values, and identify at least one element that has a ranking score greater than a predefined threshold as a representative element of the webpage.

16. The computer readable medium as claimed in claim 15, wherein the instructions, when executed by the at least one processor and further cause the computing device to perform at least one of:

extracting keywords from the at least one element as keywords representative of the webpage;

advertising on the webpage based on the at least one element;

generating a summary of the webpage; or providing a recommendation based on the at least one element.

17. The computer readable medium as claimed in claim 15, wherein the instructions, when executed by the at least one processor and further cause the computing device to assign one or more ranking scores to the plurality of elements.

18. The computer readable medium as claimed in claim 17, wherein the instructions, when executed by the at least one processor further cause the computing device to perform altering the one or more ranking scores of the plurality of elements based on analyzing.

19. The computer readable medium as claimed in claim 18, wherein altering the one or more ranking scores comprises at least one of:

decreasing a ranking score of a first element if the first element is visible in the first viewport and not visible in the second viewport, wherein the second size of the second viewport is smaller than the first size of the first viewport;

increasing the ranking score of the first element if size of the first element is larger in the second viewport than that in the first viewport, wherein the second size of the second viewport is smaller than the first size of the first viewport; or increasing the ranking score of the first element if a position of the first element in a sorted document object model of the first viewport is higher than that in a sorted document object model of the second viewport, wherein the second size of the second viewport is smaller than the first size of the first viewport.

20. The method of claim 1, wherein the electronic device is at least one of a client device or a server, and the properties comprise Cascading Style Sheets (CSS) properties.

* * * * *